US011032156B1

(12) United States Patent
Jain et al.

(10) Patent No.: US 11,032,156 B1
(45) Date of Patent: Jun. 8, 2021

(54) CRASH-CONSISTENT MULTI-VOLUME BACKUP GENERATION

(71) Applicant: Amazon Technologies, Inc., Seattle, WA (US)

(72) Inventors: Lalit Jain, Seattle, WA (US); Sandeep Kumar, Sammamish, WA (US); Ankit Singh, Sammamish, WA (US); James Pinkerton, Sammamish, WA (US); Marc Stephen Olson, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 24 days.

(21) Appl. No.: 16/370,074

(22) Filed: Mar. 29, 2019

(51) Int. Cl.
*H04L 12/24* (2006.01)
*H04L 29/08* (2006.01)

(52) U.S. Cl.
CPC .......... *H04L 41/22* (2013.01); *H04L 67/1095* (2013.01); *H04L 67/1097* (2013.01); *G06F 2201/84* (2013.01)

(58) Field of Classification Search
CPC .. H04L 41/22; H04L 67/1097; H04L 67/1095
See application file for complete search history.

(56) References Cited

U.S. PATENT DOCUMENTS

| | | | |
|---|---|---|---|
| 7,308,545 B1* | 12/2007 | Kekre | G06F 11/2097 707/999.202 |
| 9,417,815 B1 | 8/2016 | Elisha | |
| 9,652,333 B1* | 5/2017 | Bournival | G06F 9/45533 |
| 2007/0016754 A1 | 1/2007 | Testardi | |
| 2010/0037031 A1 | 2/2010 | DeSantis | |
| 2010/0070726 A1 | 3/2010 | Ngo et al. | |
| 2010/0318757 A1 | 12/2010 | Beeken et al. | |
| 2017/0131913 A1* | 5/2017 | Gordon | G06F 3/065 |
| 2018/0217756 A1* | 8/2018 | Liu | G06F 3/0619 |

\* cited by examiner

*Primary Examiner* — Joe Chacko
(74) *Attorney, Agent, or Firm* — Knobbe, Martens, Olson & Bear, LLP

(57) ABSTRACT

Aspects relate to a framework for utilizing a single API request to manage the creation of consistent snapshots for a set of volumes attached an individual instance in a distributed computing environment. Responsive to receipt of an API request identifying the instance, the multi-volume snapshot service identifies a set of volumes attached to the identified instance. The identified set of volumes can be processed or filtered to eliminate specific volumes or types of volumes, such as boot volumes. In the event that any snapshot creation attempt fails, the multi-volume snapshot service fails the API request and can delete any snapshot data generated prior to the failure.

18 Claims, 8 Drawing Sheets

CRASH-CONSISTENT MULTI-VOLUME BACKUP GENERATION

BACKGROUND

Cloud computing, in general, is an approach to providing access to information technology resources through services, such as Web services, where the hardware and/or software used to support those services is dynamically scalable to meet the needs of the services at any given time. In cloud computing, elasticity refers to network-delivered computing resources that can be scaled up and down by the cloud service provider to adapt to changing requirements of users. The elasticity of these resources can be in terms of processing power, storage, bandwidth, etc. Elastic computing resources may be delivered automatically and on-demand, dynamically adapting to the changes in resource requirement on or within a given user's system. For example, a user can use a cloud service to host a large online streaming service, setup with elastic resources so that the number of webservers streaming content to users scale up to meet bandwidth requirements during peak viewing hours, and then scale back down when system usage is lighter.

A user typically will rent, lease, or otherwise pay for access to resources through the cloud, and thus does not have to purchase and maintain the hardware and/or software to provide access to these resources. This provides a number of benefits, including allowing users to quickly reconfigure their available computing resources in response to the changing demands of their enterprise, and enabling the cloud service provider to automatically scale provided computing service resources based on usage, traffic, or other operational needs. This dynamic nature of network-based computing services, in contrast to a relatively infrastructure of on-premises computing environments, requires a system architecture that can reliably re-allocate its hardware according to the changing needs of its user base.

DETAILED DESCRIPTION

Figure 1:
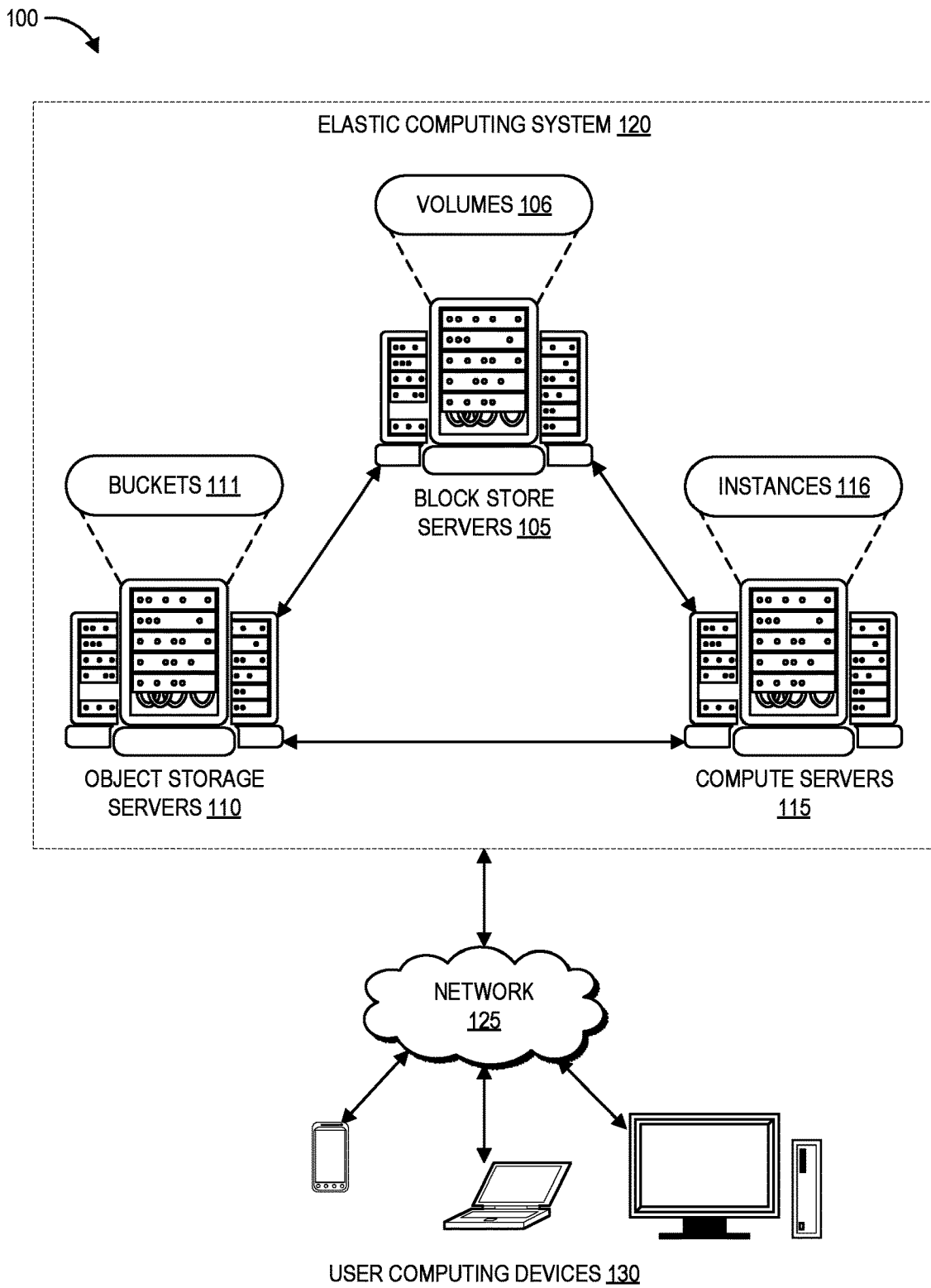
FIG. 1 depicts a schematic diagram of an elastic computing system in which various embodiments according to the present disclosure can be implemented.

Generally described, the present disclosure relates to the creation and management of batches of consistent backups or snapshots for related data volumes stored in a distributed computing environment. A volume as described herein refers to virtualized storage, for example, a persistent block storage available for use by compute instances in the distributed computing environment. A user can take a "snapshot" of a volume that represents a point-in-time copy of the data of the volume. Aspects of the present disclosure relate to providing a command by which users or an automated system can initiate the generation of consistent snapshots for a group of volumes via a single, multi-volume request. For example, it may be desirable to generate snapshots for all volumes attached to an identified virtual machine instance, such as upon crash of the instance or at some other time when a point-in-time backup is desired. The disclosed techniques create consistent backups by capturing a set of snapshots of all these volumes at the same, or a consistent point in, time (referred to herein as "consistent snapshots"). Because they may provide a restore point when captured upon or just prior to a crash, power-off, or reset, such backups can be referred to as "crash-consistent snapshots." The disclosed techniques can involve freezing or suspending I/O to all partitions of all volumes at the same time and continuing to keep I/O frozen until a view of the data (e.g., a snapshot object) has been created. I/O can then be resumed to the partitions, and the data may then be copied asynchronously into the snapshot object. The results of the group volume snapshot processing can be provided via a user interface, which can be asynchronously updated.

Snapshots of volumes are typically generated singularly on a per volume basis. More specifically, backups or snapshots of a volume can be generated by way of an application protocol interface ("API") request identifying the volume to be processed. Typically, the generation of singular backups of individual volumes do not consider (or are not able to consider) the success or failure of the generation of snapshots for other volumes, for example a number of other volumes attached to a common instance. Rather, to make a snapshot for all the volumes attached to a common instance, a user must identify each individual volume and transmit successive snapshot requests for each volume. As a snapshot represents a point-in-time copy of the corresponding volume, such per-volume approaches result in a set of snapshots that represent different points in time. This may not enable successful restoration of the instance to a particular point in time, as the volume snapshots represent different points in time. Further, using existing techniques only a portion of the snapshots for a group of volumes may be successfully generated, resulting in a partial set of snapshots of the volumes attached to the instance. Because this partial set does not represent all volumes at the same point in time, storing the partial set can result in wasteful usage of storage resources (potentially at cost to the user).

The aforementioned problems, among others, are addressed in some embodiments by the disclosed multi-volume snapshotting techniques. The disclosed techniques can involve using a single interface that instructs a distributed computing environment to generate snapshots (or other suitable backup copies) for each of a plurality of volumes attached to an individual instance hosted in the distributed computing environment. Embodiments disclosed herein can present a single interface embodied as an API request that initiates creation of snapshots for all volumes in a group, for example all volumes attached to a particular computing instance (or a set of instances), or all volumes belonging to the same Redundant Array of Independent Disks (RAID) 0 group. In response to receiving a batch snapshot request through such an API, a control plane of the distributed computing environment can identify the set of volumes that is to be snapshotted together. In one example, each volume can be stored as a single partition or up to sixteen different partitions (or some other suitable partition limit). Each partition may be stored on a different computing device, such as a server in a distributed computing environment, or multiple partitions may be stored on a single computing device. Volumes may be replicated for fault tolerance, and the partitions of one or more replicas may be accessed to create the disclosed snapshots. Accordingly, in response to receiving a batch snapshot request, the control plane can identify the locations of the partition(s) of each volume within the physical fleet of computing devices and initiate creation of snapshots of each partition.

To generate a set of consistent snapshots for the identified set of volumes, the distributed computing system processes snapshot requests for the each individual volumes such that the set of resulting snapshots reflect the data across all volumes at a consistent point in time. The distributed computing system then attempts to generate a snapshot for each individual volume by obtaining the individual geometries for each volume to identify the servers hosting each partition. The distributed computing system then proceeds to halt input/output (I/O) for all the identified partitions. The distributed computing system then generates snapshot data for each partition and the I/O is resumed. The distributed computing system can process each partition in parallel, as a batched set of requests, or in an iterative manner.

According to the present disclosure, an error generating snapshot data for any one of the partitions (e.g., an I/O suspension failure or snapshot generation failure) can result in the failure of the entire multi-volume snapshot request. This can help ensure that all snapshots created using a single API call are consistent (e.g., represent the same point in time). In such scenarios, any data that has been successfully stored for other partitions can be automatically deleted, and a message can be generated and provided to a corresponding user to indicate failure of the request. Beneficially, this does not result in an incomplete set of snapshots being stored and provided to a user. In some embodiments, the distributed computing environment generates a user interface identifying all the volumes and the snapshot request processing status for each volume. The interface can be updated asynchronously with the results of the individual snapshot request to indicate individual snapshot request status.

As would be appreciated by one of skill in the art, the provision of a single interface, such as an API requesting the generation of consistent snapshots, for example consistent snapshots of a group of volumes identified by their attachment to an instance, as disclosed herein, represents a significant technological advance over prior implementations. Specifically, the use of a single interface to generate a set of consistent snapshots, as disclosed herein, enables a distributed computing system to facilitate consistent backup of a set of data volumes on a per-instance basis (or other group basis). Utilization of the disclosed single request for a generating consistent snapshots of multiple volumes eliminates the potential for generation of a partial set of snapshots that does not include backups of all the needed volumes.

Further, the disclosed techniques beneficially provide a reduction in the number of API calls required to create a set of consistent snapshots for a set of volumes, and thus, also provides reduction in the I/O freeze time when creating backups spanning multiple volumes. Moreover, as would be recognized by one skilled in the art, the embodiments described herein provide a technical solution to a long standing technical problem within the field of information retrieval and data storage, by enabling crash consistent backups for volumes belonging to the same group, and by enabling crash consistent database backups that contain data and log files stored on separate volumes. As such, the embodiments described herein represent significant improvements in computer-related technology.

Various aspects of the disclosure will now be described with regard to certain examples and embodiments, which are intended to illustrate but not limit the disclosure. Although the examples and embodiments described herein will focus, for the purpose of illustration, specific calculations and algorithms, one of skill in the art will appreciate the examples are illustrative only, and are not intended to be limiting. For example, embodiments of the present application will be described with regard to volumes implemented in a system that maintains two replicas (e.g., a primary and a secondary replica). However, the disclosed multi-volume snapshotting techniques may be used in conjunction with a single replica, or with systems that store three or more replicas. Thus, references to a primary or secondary replica, as used herein, should be understood to refer generally to a volume independent of the number of replicas. Still further, aspects of the present application will be described with regard to replicas that are distributed as partitions maintained at different physical computing devices. The number of partitions and physical computing devices maintaining the replicas should not be construed as limiting. Still further, aspects of the present application will be described with regard to implementation of snapshots on object storage servers of an elastic computing system. However, snapshots may be maintained in other implementations, such as via a highly-partitioned replica including a number of partitions sufficient to enable rapid implementation of intensive I/O operations, such as duplication of an entire volume. This number of partitions of such a highly distributed backup copy may be, for example, between a thousand and millions of partitions. Accordingly, the creation and maintenance of consistent snapshots for volumes should not be limited to any of the specific illustrations discussed in accordance with aspects of the present application.

Overview of Example Computing Environment

FIG. 1 depicts an example computing environment 100 including an elastic computing system 120 in which the disclosed multi-volume consistent snapshotting techniques can be implemented. The elastic computing system 120 can be accessed by user devices 130 over a network 125. The elastic computing system 120 includes one or more compute servers 115, one or more object storage servers 110, and one or more block store servers 105 that are in networked communication with one another and with the network 125 to provide users with on-demand access to computing resources including instances 116, volumes 111, and buckets 106, among others. These particular resources are described in further detail below. Some implementations of elastic computing system 120 can additionally include domain name services ("DNS") servers, relational database servers, and other server configurations (not illustrated) for supporting on-demand cloud computing platforms. Further, the elastic computing system 120 may include dedicated server(s) for implementing the control plane functionalities described herein. Each server includes hardware computer memory and processors, an operating system that provides executable program instructions for the general administration and operation of that server, and a computer-readable medium storing instructions that, when executed by a processor of the server, allow the server to perform its intended functions.

The elastic computing system 120 can provide on-demand, scalable computing platforms to users through the network 125, for example allowing users to have at their disposal scalable "virtual computing devices" via their use of the compute servers 115, object storage servers 110, and block store servers 105. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software.

Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

The elastic computing system 120 can be provided across a number of geographically separate regions, for example to provide users with lower latencies by having their virtual computing devices in or near their geographic location. Each region is physically isolated from and independent of every other region in terms of location and power supply, and may communicate data with the other regions through the network 125. Each region can include two or more availability zones each backed by one or more physical data centers provided with redundant and separate power, networking and connectivity to reduce the likelihood of two zones failing simultaneously. While a single availability zone can span multiple data centers, no two availability zones share a data center. This can protect users from data-center level failures. A data center refers to a physical building or enclosure that houses and provides power and cooling to one or more of the compute servers 115, object storage servers 110, and block store servers 105. The data centers within an availability zone and the availability zones within a region are connected to one another through private, low-latency links, for example fiber optic network cables. This compartmentalization and geographic distribution of computing hardware enables the elastic computing system 120 to provide fast service to users on a global scale with a high degree of fault tolerance and stability. To distribute resources evenly across the zones in a given region, the provider of the elastic computing system 120 may independently map availability zones to identifiers for each user account.

Turning specifically to the roles of the different servers within the elastic computing system, the compute servers 115 include one or more servers on which provide resizable computing capacity to users for building and hosting their software systems. Users can use the compute servers 115 to launch as many virtual computing environments, referred to as "instances" 116, as they need. Instances 116 can have various configurations of processing power, memory, storage, and networking capacity depending upon user needs. The compute servers 115 can also include computer storage for temporary data used while an instance is running, however as soon as the instance is shut down this data may be lost.

The block store servers 105 provide persistent data storage for the compute servers 115 in the form of volumes 106. The block store servers 105 include one or more servers on which data is stored as blocks. A block is a sequence of bytes or bits, usually containing some whole number of records, having a maximum length of the block size. Blocked data is normally stored in a data buffer and read or written a whole block at a time. Blocking can reduce overhead and speed up the handling of the data-stream. Each block is assigned a unique identifier by which it can be stored and retrieved, but typically is not assigned metadata providing further context.

User volumes 106, which can be treated as an individual hard drive ranging for example from 1 GB to 1 terabyte TB in size, are made of one or more blocks stored on the block store servers 105. Although treated as an individual hard drive, it will be appreciated that the hardware storing a volume may not actually be a hard drive, but instead may be one or more virtualized devices implemented on one or more underlying physical host devices. Volumes 106 may be partitioned a small number of times (e.g., up to 16) with each partition hosted by a device of the elastic computing system 120. Reference to a geometry of a volume can include identification of the physical host devices that maintain one or more partitions that form the logical construct of the volume. These volumes provided persistent, dedicated storage that can be attached to particular instances of the compute servers 115. Individual volumes may be attached to a single instance running on a compute server 115, and can be detached from that instance and re-attached to another. In some scenarios, multiple volumes may be attached to a single instance. As used herein, "attached" refers to the ability of an instance (or other virtualized computing resource) to access the data of a volume and perform I/O on the data. The block store servers 105 have built-in redundancy for volumes by replicating the volume across multiple servers (for example within an availability zone), which means that volumes will not fail if an individual drive fails or some other single failure occurs.

The object storage servers 110 represent another type of storage within the elastic computing environment 120. The object storage servers 110 include one or more servers on which data is stored as objects within resources referred to as buckets 111. Each object typically includes the data being stored, a variable amount of metadata that enables various capabilities for the object storage servers 110 with respect to analyzing a stored object, and a globally unique identifier or key that can be used to retrieve the object. Objects stored on the object storage servers 110 are associated with a unique identifier, so authorized access to them can be obtained through requests from networked computing devices in any location. Each bucket is associated with a given user account. Users can store as many objects as desired within their buckets, can write, read, and delete objects in their buckets, and can control access to their buckets and the contained objects. Further, in embodiments having a number of different object storage servers 110 distributed across different ones of the regions described above, users can choose the region (or regions) where a bucket is stored, for example to optimize for latency. Users can use object storage servers 110 for purposes such as storing photos on social media websites, songs on music streaming websites, or files in online collaboration services, to name a few examples. Applications developed in the cloud often take advantage of object storage's vast scalability and metadata characteristics. The object storage servers 110 can support highly parallel data accesses and transfers.

The object storage servers 110 can offer even greater redundancy than the block store servers 105, as the object storage servers 110 can automatically replicate data into multiple availability zones. While the object storage servers 110 can be used independently from the instances and volumes described above, they can also be used to provide data backup as described below with respect to snapshots (e.g., object-stored backups of volume data). As will be described, aspect of the present application related to the processing of a multi-volume snapshot request (e.g., a single API request) that relate to the generation of a set of consistent snapshots for a set of volumes 106, for example volumes attached to a single instance identified in the API. However, as indicated previously, consistent snapshot data can be maintained in different types of servers in alternative to or in addition to the object storage servers 110. For example, a backup copy of a volume may be maintained as a highly partitioned replica stored on the block store servers 105, where such highly partitioned replica may be distributed across a number of containers stored on the block store servers 105.

The elastic computing system 120 can communicate over network 125 with user devices 130. The network 125 can include any appropriate network, including an intranet, the Internet, a cellular network, a local area network or any other such network or combination thereof. In the illustrated embodiment, the network 125 is the Internet. Protocols and components for communicating via the Internet or any of the other aforementioned types of communication networks are known to those skilled in the art of computer communications and thus, need not be described in more detail herein. User devices 130 can include any network-equipped computing device, for example desktop computers, laptops, smartphones, tablets, e-readers, gaming consoles, and the like. Users can access the elastic computing system 120 via the network 125 to view or manage their data and computing resources, as well as to use websites and/or applications hosted by the elastic computing system 120.

Users can instruct the elastic computing system 120 to create snapshots of individual volumes stored on the block store servers 105 via an application programming interface ("API"). Illustratively, a snapshot is a point-in-time block-level backup of the volume, stored as a copy of data on the volume on one or more of the object storage servers 110 (e.g., as a single object or a collection of objects) or in another suitable format as described herein. Snapshots may be accessible through an API of the control plane 155. In the event the creation of a snapshot cannot be completed, the snapshot creation request fails and the user can be provided with information regarding the success/failure of the snapshot creation for individual volumes.

In one example, snapshots are implemented as incremental records of data within a volume. Illustratively, when the first snapshot of a volume is taken, all blocks of the volume (e.g., from the plurality of partitions forming the "volume"), that contain valid data are copied as one or more objects to the object storage servers 110. A snapshot "table of contents" or "manifest" file is then written to the object storage servers 110 that includes a record of the one or more objects, as well as the blocks of the volume to which each of the one or more objects correspond. Due to the use of incremental snapshots, when the subsequent snapshots are taken of the same volume (e.g., from the same number of partitions forming the volume), only the blocks that have changed since the first snapshot need by copied to the object storage servers 110, and the table of contents or manifest file can be updated to point to the latest versions of each data block (or a second table of contents or manifest file can be created, enabling the initial table of contents or manifest file to remain as a record of a prior version of the volume). An initial snapshot can be used to reconstruct the volume at the time of the initial snapshot, or snapshots from subsequent time points can be combined together or with the initial snapshot to reconstruct the entire volume at any individual subsequent point in time. In this way, snapshots can serve as both incremental backups and a full backup of a given volume.

When creating a snapshot, any data written to the volume up to the time the snapshot is started can be included in the snapshot, and users can continue to perform I/O operations to their volumes during snapshot creation without affecting the snapshot. Users can create a new volume from a snapshot, for example to create duplicates of their volumes or to restore data. The new volume will contain all the data stored in the snapshot and thus will be a duplicate of the original volume at the time the snapshot was started. In this manner, snapshots can also be used to transfer a volume's data from one availability zone to another. Similarly, snapshots can be taken of instances to create a "machine image" of that instance stored in the object storage servers 110, and new copies of the instance can be launched from the machine image.

As described above, individual instances 106 may be associated with multiple volumes (e.g., a given instance may have access to multiple volumes as virtualized disk storage). Using the above-described mechanisms, in order to create consistent snapshots for all volumes 106 attached to a specified instance 116, the block store servers 105 must process an API request for each individual volume attached to the specified instance. According to previous techniques, this may require issuance of multiple snapshot creation API requests, which can create inconsistency with respect to the specific point-in-time utilized to generate the snapshot for the individual volume. For example, if the block store servers 105 simply queue and process snapshot creation API requests for a set of volumes, each individual processing of an API request would correspond to a different point-in-time at which the API would be executed. Additionally, because each API is a singular request in such implementations, the indication of success or failure is generated separately for each respective API request. If any processing of an individual API request results in a failure, that singular failure is independent of, and does not affect the processing of, previous or subsequent API requests. Accordingly, any singular failure or multiple failures creates situations in which the object storage servers 110 have valid snapshots for a particular point-in-time for only a subset of volumes attached to a particular instance.

Figure 2:
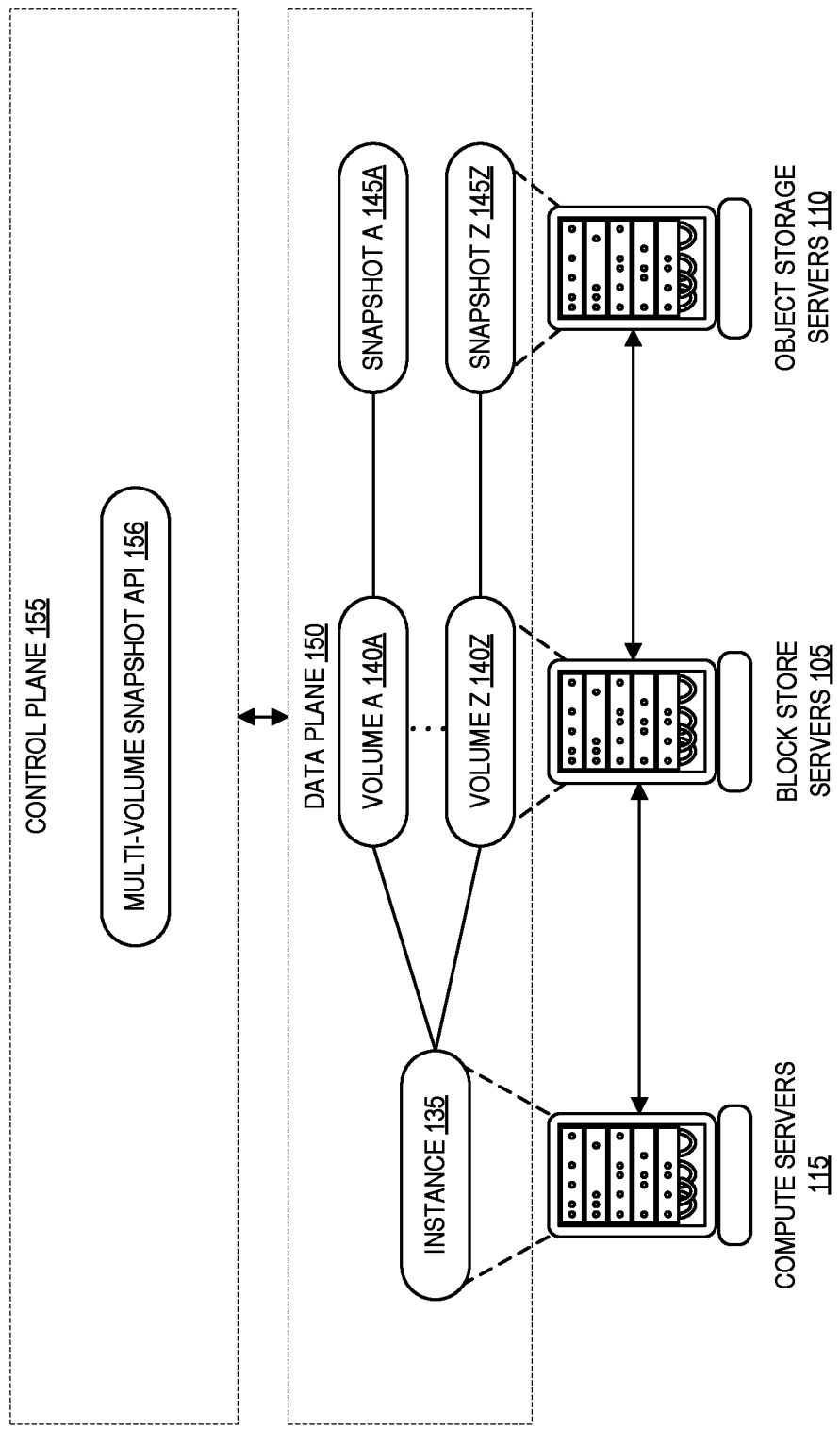
FIG. 2 depicts a schematic diagram of replicated data instances according to the present disclosure within the elastic computing system of FIG. 1.

As illustrated in FIG. 2, to address at least some of the deficiencies associated with the above-described singular volume snapshot creation API approach, one or more aspects of the present application correspond to the processing of a single multi-volume snapshot API 156 for generating a set of consistent snapshots for a set of volumes, for example, volumes associated with an instance identified to the API 156. Responsive to an identifier associated with the instance, a set of volumes attached to the instances is identified. The identified set of volumes may be processed to limit or exclude volumes, such as eliminate boot volumes from the set. Based on the processed set of volumes, an interface identifying the set of snapshots to be generated is generated and provided to a user. Thereafter, a snapshot is attempted for each identified volume by suspending I/O to each partition, creating the snapshot data, and then re-enabling the I/O. A failure of the processing of any partition results in a failure of the entire multi-volume snapshot request, and any snapshot data generated up to the point of the failure may be automatically deleted. The interface is asynchronously updated with the result of each individual snapshot generation.

FIG. 2 depicts an example of how the compute servers 115 can host an instance 135 that is attached to two volumes 140A and 140Z hosted on the block store servers 105. The multi-volume snapshot API 156 can be used to create snapshots 145A and 145Z for the individual volumes 140A and 140Z, respectively. The snapshots 145A and 145Z can be hosted on object storage servers 110, as depicted in FIG. 2, or can be stored in other suitable backup formats as described herein (e.g., on the block store servers 105 as highly partitioned, read-only replicas of the volumes 140A and 140Z). Although only two volumes 140A and 140Z are illustrated as being attached to instance 135, one skilled in the relevant art will appreciate that an instance may be associated with different variety a different volumes. For purposes of illustration, each volume is represented as a logical single volume, however it will be appreciated that each volume can be implemented as a set of distributed partitions hosted by different physical computing hosts, with each partition replicated a number of times for redundancy.

In some embodiments, one or more of the volumes 140A, 140Z may be characterized as having a specific type of function or characteristics, such as a volume configured to function as a boot volume that typically maintains operating system files and configurations. The volumes 140A, 140Z can also be characterized according to priority of the data maintained in the volume or intended function. As will be described below, in some embodiments, one or more volumes attached to an identified instance may be removed from the target list of volumes included in a multi-volume snapshot request, for example based on type or specific identifier.

FIG. 2 also depicts a data plane 150 and a control plane 155 of the elastic computing system 120. The data plane 150 represents the movement of user data through the elastic computing system 120, while the control plane 155 represents the movement of control signals through the elastic computing system 120, including control signals generated by the multi-volume snapshot API 156. One skilled in the art will appreciate that the data plane 150 and control plane 155 represent logical constructs related to the operation of servers of the computing system 120, rather than a physical configuration of the servers.

The control plane 155 is a logical construct that can be implemented by at least one server with computer-executable software for coordinating system and user requests and propagating them to the appropriate servers in the elastic computing system 120. Functions of the control plane 155 include replication of data, failover operations, and receiving requests from users for specific actions to be performed with respect to the data plane 150. These can include creating, cloning, and snapshotting volumes 106, for example by use of the multi-volume snapshot API 156. The data plane 150 in the illustrated embodiment is implemented by execution of operations on the instance 135, volumes 140A, 140B, and snapshots 145A and 145Z.

Overview of Example Embodiments for Snapshot Generation

Figure 3A:
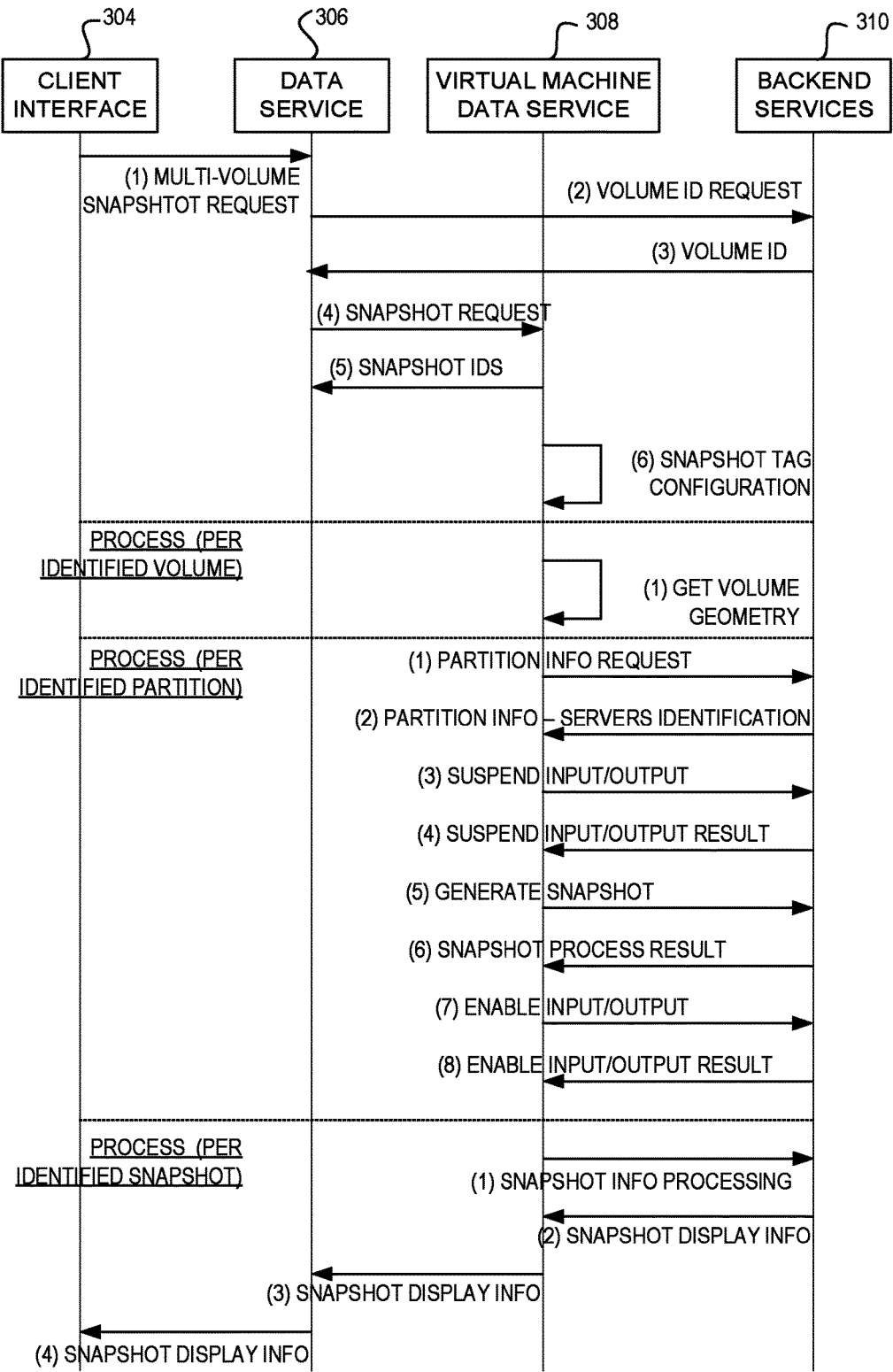
FIG. 3A depicts a schematic diagram of the processing of a multi-volume snapshot request to generate a set of snapshots for an identified instance.

FIG. 3A depicts a schematic diagram of generating a snapshot backup of a volume responsive to a multi-volume API request from a client interface 305, such as an interface generated by a user computing device 130. As described above, a snapshot is a point-in-time block-level backup of the volume, stored as a copy of data on the volume in the object storage 215 (e.g., as a single object or a collection of objects). In some implementations, snapshots are implemented as incremental records of data within a volume, such that when the first snapshot of a volume is taken, all blocks of the volume (according to individual partition) containing valid data are copied as one or more objects to the object storage 215. When subsequent snapshots are taken of the same volume, only the blocks that have changed since the first snapshot need by copied to the object storage 215. When creating a snapshot for any volume, any data written to the volume up to the time the snapshot is started can be included in the snapshot, and users can continue to perform I/O operations to their volumes as the data is transferred to the snapshot without affecting the snapshot. A failure to generate snapshot data for any individual partition of a volume will result in a failure of the snapshot request for the volume. Additionally, a failure of a snapshot request for a volume of the set of volumes will generally result in a failure of the multi-volume snapshot request. The result of the individual snapshot request can be asynchronously provided and updated via a user interface. However, in the event that any individual snapshot request is not successful, the result of the multi-volume API is considered to fail and processed such that a partial set of volume snapshots are not made available to the user.

With reference FIG. 3A, at (1), the multi-volume snapshot request corresponds to a single API request that is transmitted from the client interface 302 to a data service 304 that is associated with the elastic computing system 120 and is configured to receive the API request. The API request illustratively identifies an instance having a plurality of attached volumes. The multi-volume snapshot request can include client identifiers or other authentication information. Additionally, in some embodiments, the multi-volume snapshot request can include configuration information for the processing of the multi-volume snapshot request. For example, the multi-volume snapshot request can include an identification of one or more volumes that should be excluded from the creation of snapshot from multiple volumes. The volumes to be excluded can be specified by specific volume identifier or by type or function (e.g., boot volumes). In other embodiments, the volumes to be excluded can be preconfigured based on user profiles or system profiles and may not need to be specified in the multi-volume snapshot request. Additionally, the multi-volume snapshot request can include specific identifiers, metadata, tags, or references to configurations/profiles that can be utilized later to search or instrument the snapshots. For example, the API request can include client specified criteria, such as timestamps, hashes, origination information, etc., that facilitates later identification or retrieval of the set of snapshots.

At (2), the data service 304 transmits a request to backend services 308, for an identification of the volumes that are associated or attached to the instance. At (3), the backend services 308 provide a listing of the volumes attached to the identified instances, such as by volume identifiers, and that will form the set of volumes. The results of the identification of the volumes can include addressing information, volume identifiers, snapshot identifiers, security information, and the like that can be utilized in the processing of snapshot requests for individual volumes. As will be described in in some embodiments, the initial set of volumes can be filtered by filtering or excluding any volumes included in the multi-volume snapshot request or configured as part of a snapshot generation configuration/profile.

At (4), the data service 304 generates an instruction to the virtual machine data service 306 to generate and manage a set of consistent snapshots for the identified and filtered set of volumes. At (5), the virtual machine data service 306 returns a set of snapshot identifiers or other information (such as security information) that will be utilized to track the status and progress of the generation of the snapshots. At (6), the virtual machine data service 306 configures tags for the snapshots. As described above, the tags can illustratively include the specific identifiers, meta-data, tags, or references to configurations/profiles that can be utilized later to search or instrument the snapshots. For example, the API request can include client specified criteria, such as timestamps, hashes, origination information, etc., that facilitates later identification or retrieval of the set of snapshots. The tags can further include key-value pairs identifying the partitions, and any associated permissions/access rights for the partitions. At this point, the virtual machine data service 306 is ready to begin generating snapshot data for each of the identified volumes.

Illustratively, the generation of snapshot data for the identified and filtered set of volumes may be conducted in parallel, in batches or iteratively. Accordingly, the virtual machine data service 306 implements a first process corresponding to processing each individual identified volume. More specifically, for individual volumes from the set of volumes, the virtual machine data service 306 first obtains the volume geometry for the volume. Illustratively, the volume geometry includes an identification of the physical host devices that host the partitions forming the volume, as discussed above. The process identified in FIG. 3A will be repeated or conducted in parallel multiple times per volume.

For each identified partition, the virtual machine data service 306 then enters into a second process to process the partition data for the snapshot generation. As also described above, illustratively, the generation of snapshot data for the identified set of partitions for an identified volume may be conducted in parallel, in batches or iteratively. The process identified in FIG. 3A will be repeated or conducted in parallel multiple times per partition. At (1), the virtual machine data service 306 obtains the addressing and location information for the partition on the server device from backend services 308, such as a database service. At (2), the virtual machine data service 306 then receives identifiers for each snapshot that will be generated. At (3), the virtual machine data service 306 transmits a request to an identified server hosting the partition to suspend input/outputs. The request to suspend input/outputs can include necessary security identifiers or timing information. Illustratively, the virtual machine data service 306 can continue to receive data for the volumes and cache the data until input/outputs are restored. At (4), the receiving servers (directly or indirectly) return a confirmation that inputs/outputs have been suspended.

At (5), the virtual machine data service 306 generates a command for the generation of snapshot information from the specific partition. One skilled in the relevant art will appreciate that the snapshots can be generated from the collection of data from the individual partitions. At (6), the virtual machine data service 306 receives a confirmation regarding the processing snapshot request. At (7), the virtual machine data service 306 transmits a request to an identified server hosting the partition to restart input/outputs. The request to suspend input/outputs can include necessary security identifiers or timing information. At (8), the receiving servers (directly or indirectly) return a confirmation that inputs/outputs have been restarted. The virtual machine data service 306 can then begin writing any cached data. Although not explicitly illustrated in FIG. 3A, at various steps, such as the suspension of the input/outputs, etc., the virtual machine data service 306 may experience or receive an indication of a failure (e.g., a suspend input/output result). In such scenarios, the processing of the partition to generate snapshot data would be considered to be failure and in turn the processing of the snapshot request for the identified volume would also be considered a failure. Thus, a determination of success or failure of individual steps in at least a subset of the identified interactions can be included and utilized to generate the determined result of the overall generation of the snapshot per volume.

In addition to the creation of the consistent snapshot data, the virtual machine data service 306 enters into another process regarding the processing of a user interface corresponding to the status of the generation of the snapshots for the set of identified volumes. Illustratively, a failure of any one snapshot generation will result in a failure of the multi-volume request. However, the user interface can be generated for each identified and then asynchronously updated with a result of each snapshot generated. If a failure occurs, the user can use the user interface to identify the volume or volumes that caused a failure.

Figure 3B:
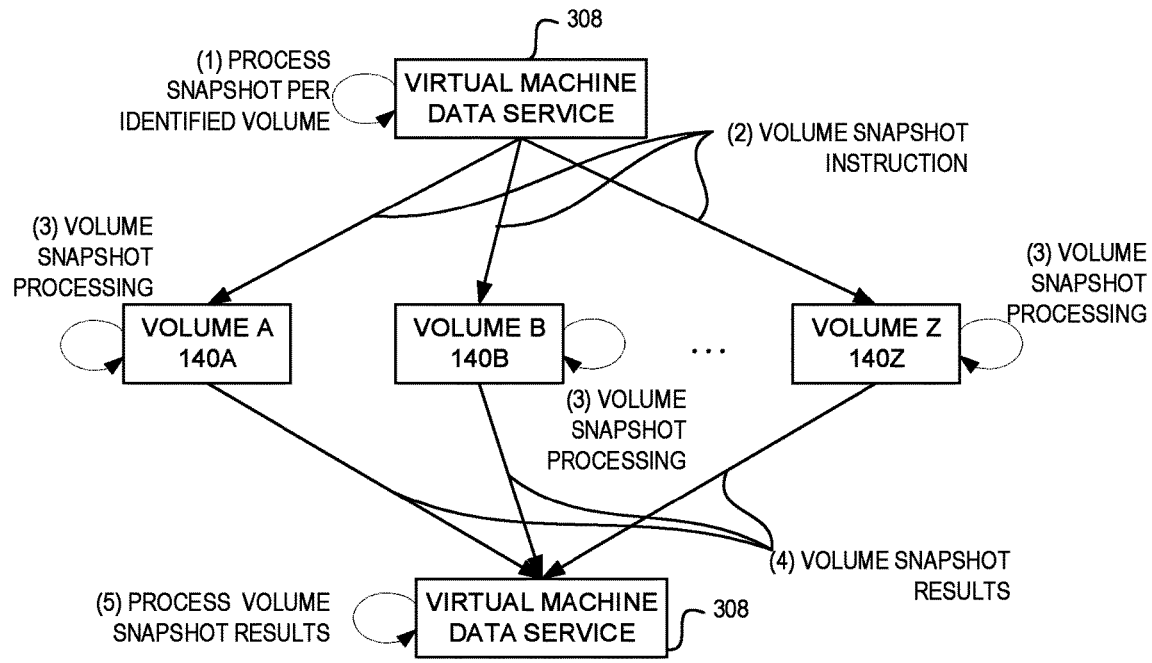
FIG. 3B depicts a schematic diagram of the processing of snapshots for a set of volumes corresponding to a multi-volume snapshot request.

With reference now to FIG. 3B, a schematic diagram of the processing of consistent snapshots for a set of volumes corresponding to a multi-volume snapshot request will be described. As described above, the portion of the process identified in FIG. 3A for processing individual volumes will be repeated or conducted in parallel per volume and that the generation of snapshot data for the identified and filtered set of volumes may be conducted in parallel, in batches or iteratively. At (1), the virtual machine data service 308 process the snapshot per volume (as indicated in FIG. 3A). At (2), the virtual machine data service 308 can generate volume snapshot instructions for each of the identified individual volumes. The instructions can be sent out sequentially or sent, at least in part, in parallel, including in batches of two or more volumes. The transmission of the snapshot instructions can factor in load of the elastic compute system 120 or characteristics of the volumes that may make processing sequentially or in parallel more appropriate.

At (3), the set of volumes 140A, 140B-140Z can individually process the snapshot request. The timing of when each individual volume attempts to generate a snapshot can vary from sequential to parallel. At (4), each individual volume 140A, 140B-140Z generates and transmits a result. The transmission of the results can also be conducted sequentially, in batches, or entirely in parallel. At (5), the virtual machine data service 308 processes the results as they are received or after a number have been received to determine whether the multi-volume snapshot request has experienced a failure and to asynchronously update the status of each individual snapshot request. Additionally, at a time in which all the volumes have completed the processing of the snapshot request, the virtual machine data service 308 can determine the overall success or failure of the multi-volume snapshot request. As described above, if the virtual machine data service determines that one or more snapshot requests have failed, it can immediately fail the multi-volume snapshot request without requiring completion of the remaining snapshot requests or otherwise cancel any pending snapshot requests.

Figure 3C:
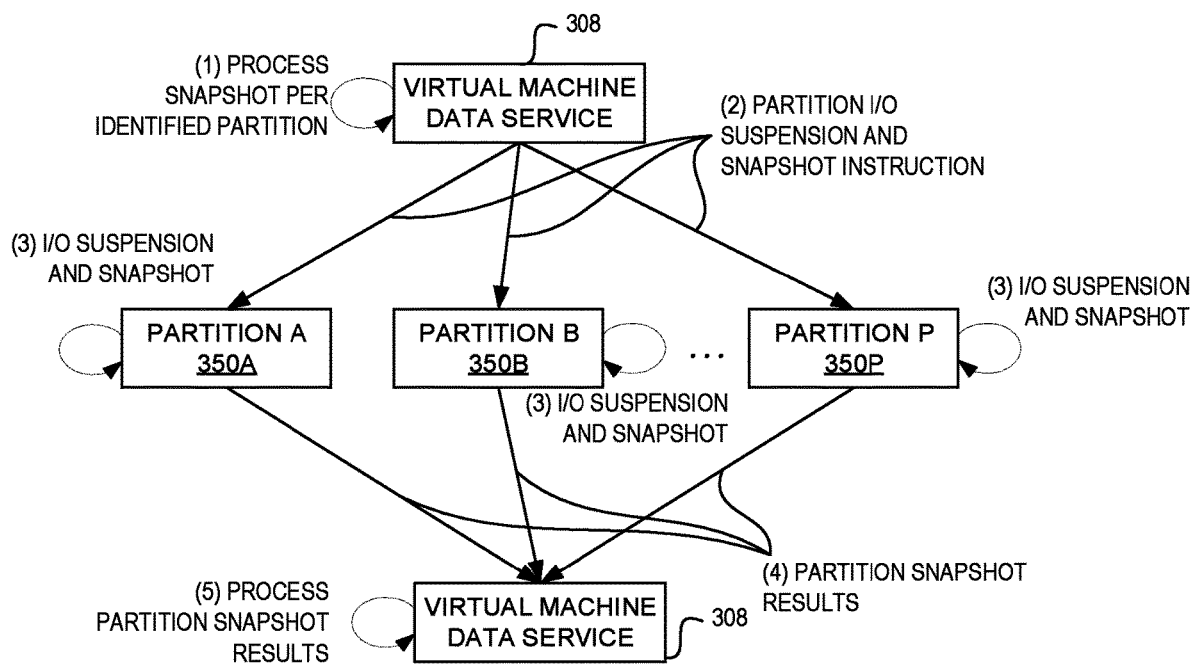
FIG. 3C depicts a schematic diagram of the processing of snapshots for a set of partitions corresponding to volumes of a multi-volume snapshot request.

FIG. 3C depicts a schematic diagram of the processing of snapshots for a set of partitions corresponding to volumes of a multi-volume snapshot request. As described above, the portion of the process identified in FIG. 3A with regard to processing individual partitions will be repeated or conducted in parallel per partition and that the generation of snapshot data for the identified and filtered set of partitions may be conducted in parallel, in batches or iteratively. At (1), the virtual machine data service 308 processes the snapshot per partition (as indicated in FIG. 3A) that have been identified in the individual geometries of the identified volumes. At (2), the virtual machine data service 308 can generate I/O suspension and snapshot instructions for each of the identified individual partitions. Temporarily freezing or suspending I/O to all partitions can enable the resulting set of snapshots to be captured at the same point in time, such that they are consistent. As illustrated in FIG. 3A, the I/O suspension and snapshot instructions correspond to a number of separate instructions and confirmations between the virtual machine data service 308 and the individual host computing devices. The I/O suspension and snapshot instructions can be sent out sequentially or sent, at least in part, in parallel, including in batches of two or more partitions. The transmission of the I/O suspension and snapshot instructions can factor in load of the elastic compute system 120 and the host computing devices hosting the partitions or characteristics of the partitions that may make processing sequentially or in parallel more appropriate.

The interactions at (2) can involve a two-phase commit process, where in a first phase the hosts storing the individual partitions agree to a specific point in time at which I/O will be suspended, and in a second phase, the snapshot is taken. Consistency among the set of snapshots can thus be achieved by freezing I/O at the same point in time across the partitions, and then keeping I/O frozen until all of the snapshots have been completed. As used herein, completing a snapshot can refer to completing set-up of the snapshot by creating a snapshot object, rather than to the completion of data transfer between the block store servers 105 and the object store server 110. To illustrate, prior to creating the set of snapshots, the control plane 155 can call a freeze API to freeze I/O to each partition of each volume involved in the multi-volume snapshot.

For example, in response to a create multi-volume snapshot request, the primary replica of each partition can be instructed to freeze IO and identify all blocks that have been written to the volume but have not been written to a snapshot. These blocks can be identified, for example, by the primary replica creating a bit vector to track all the blocks in this state. This bit vector can be saved into a snapshot object and used to create the manifest indicating which blocks to push from the block store servers to the object servers. As such, this manifest can only include the change set, in the case of incremental snapshots, or can include all blocks in the case of initial snapshots. The bit vector can also be used to track the blocks that have been or still need to be pushed to object storage. After the snapshot object is created, the set of blocks that need to be transferred for this snapshot can be fixed, such that any further change of block state will not affect the snapshot. After creating the snapshot object, the primary replica can change the state of the blocks in the bit vector to indicate that they are being included in a snapshot. The primary replica can return the list of identified blocks in this snapshot to the control plane 155, and thereafter I/O can resume to the partition and the host storing the partition can begin to transfer the identified blocks into object storage.

Returning to the interactions of FIG. 3C, at (3), the set of partitions forming the partition 350A-350P (e.g., 16 different illustrative partitions) can individually process the I/O suspension and snapshot instructions. As described above, this can involve reaching an agreement as to which point in time I/O will be frozen across the partitions, freezing I/O on each partition, and generating a snapshot object representing the blocks to be transferred for each partition. At (4), each individual partition 350A-350P generates and transmits a result representing whether the identified block data was successfully transferred to the snapshot object. The transmission of these results can also be conducted sequentially, in batches, or entirely in parallel. In the event any portion of the I/O suspension and/or block data transfer to the snapshot results in a failure (e.g., the suspension of I/O fails, or there is an error in transferring the block data), that individual partition can immediately transmit a result of failure.

At (5), the virtual machine data service 308 processes the results as they are received or after a number have been received to determine whether the set of I/O suspension and snapshot generation instructions have experienced a failure and, correspondingly, whether the multi-volume snapshot request (FIG. 3B) is a success or a failure.

Figure 4A:
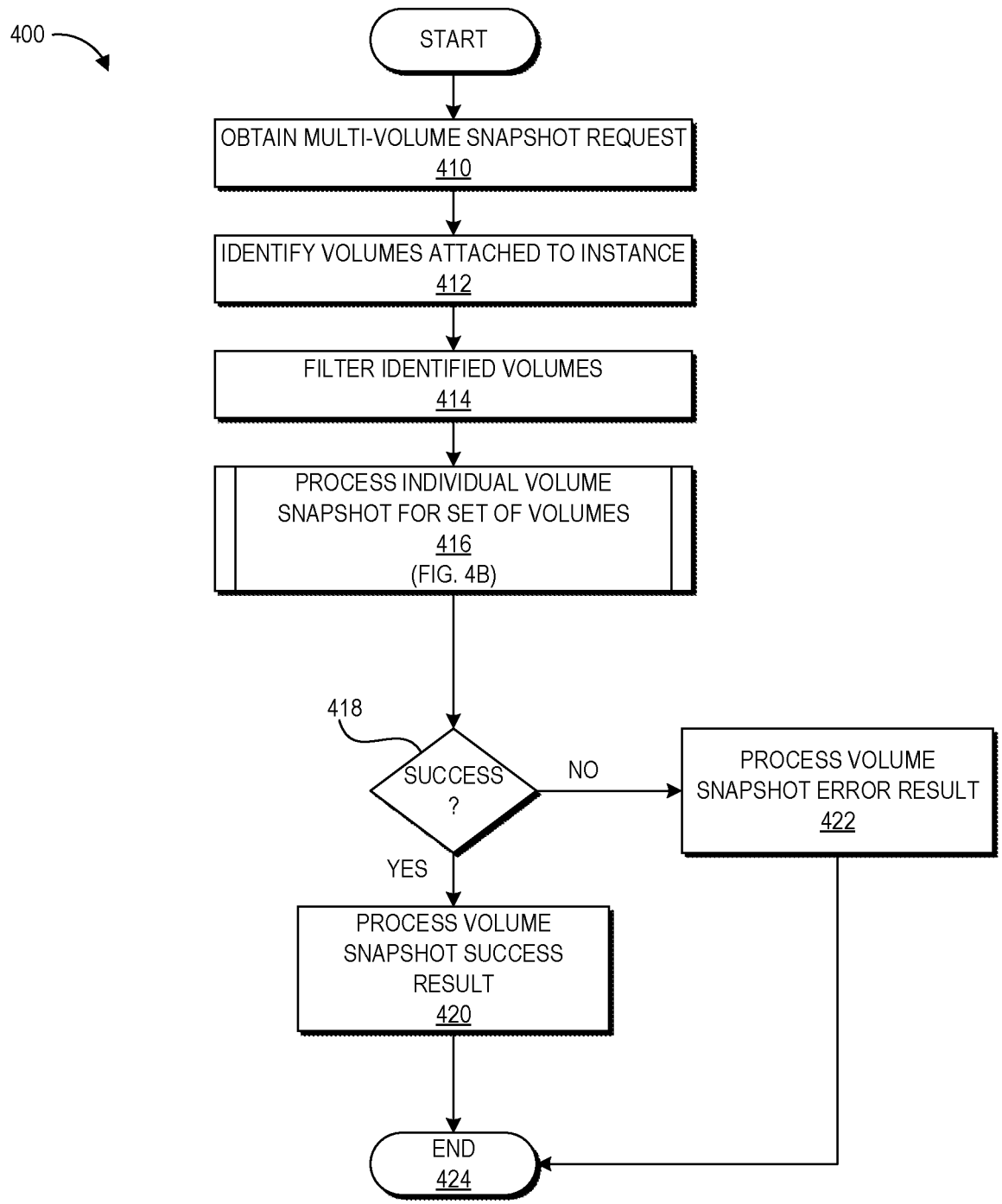
FIG. 4A is a flowchart of an example process for processing a multi-volume snapshot request in the elastic computing environment of FIG. 1.

Turning now to FIG. 4A, a routine 400 for processing multi-volume snapshot requests will be described. At block 410, the distributed computing system obtains a multi-volume snapshot request corresponds to a single API request. In some implementations, this request can be transmitted from the client interface 302 to a data service 304 that is associated with the elastic computing system 120 and is configured to receive the API request. In other implementations, users can configure this request to be transmitted automatically, for example upon detection of a crash of one of their instances. The API request illustratively identifies an instance having a plurality of attached volumes. The multi-volume snapshot request can include client identifiers or other authentication information. Additionally, in some embodiments, the multi-volume snapshot request can include configuration information for the processing of the multi-volume snapshot request. For example, the multi-volume snapshot request can include an identification of one or more volumes that should be excluded from the creation of snapshot from multiple volumes. The volumes to be excluded can be specified by specific volume identifier or by type or function (e.g., boot volumes). In other embodiments, the volumes to be excluded can be preconfigured based on user profiles or system profiles and may not need to be specified in the multi-volume snapshot request. Additionally, the multi-volume snapshot request can include specific identifiers, meta-data, tags, or references to configurations/profiles that can be utilized later to search or instrument the snapshots. For example, the API request can include client specified criteria, such as timestamps, hashes, origination information, etc., that facilitates later identification or retrieval of the set of snapshots.

At block 412, the distributed computing system obtains an identification of volumes attached to the identified instance. Illustratively, a data service 304 transmits a request to backend services 308, for an identification of the volumes that are associated or attached to the instance. The backend services 308 provide a listing of the volumes attached to the identified instances, such as by volume identifiers, and that will form the set of volumes. The results of the identification of the volumes can include addressing information, volume identifiers, snapshot identifiers, security information, and the like that can be utilized in the processing of snapshot requests for individual volumes.

At block 414, the distributed computing system filters the identified volumes. In some embodiments, the initial set of volumes can be filtered by filtering or excluding any volumes included in the multi-volume snapshot request or configured as part of a snapshot generation configuration/profile. For example, the multi-volume snapshot request can specify that specific volumes or volume types should not be included in the snapshot data. One example is a boot volume that will not typically be modified as part of the operation of the instance and does not need to be included in a snapshot for restoration of the volumes. Specifically, a boot volume may be used to launch an instance, but may not receive I/O as a result of operation of the instance. In another example, a user may also specify specific volumes by using one or more assigned identifiers. Additionally, the distributed computing system can also configure tags for the snapshots. As described above, the tags can illustratively include the specific identifiers, meta-data, tags, or references to configurations/profiles that can be utilized later to search or instrument the snapshots. For example, the API request can include client specified criteria, such as timestamps, hashes, origination information, etc., that facilitates later identification or retrieval of the set of snapshots. The tags can further include key-value pairs identifying the partitions, and any associated permissions/access rights for the partitions.

At block 416, the distributed computing system processes snapshots for individual volumes of the identified volumes. Illustratively, the distributed computing system obtains the geometry for the selected volume and for each identified partition, freezes I/O across all partitions at the same time, generates the snapshot object data, and then unfreezes I/O. An illustrative sub-routine 430 for generating snapshot information for a set of volumes as described for block 416 will be described with regard to FIG. 4B. With reference to FIG. 3B, the processing of snapshot information for a set of volumes can be implemented in a variety of ways. For example, the distributed computing system can sequentially process individual snapshots and repeat the processing steps until all the snapshots are complete or an error is encountered. In another example, the distributed computing system can process two or more snapshots in parallel or in batches. The distributed computing system can suspend processing in the event that any individual snapshot generation generates an error or indication of failure.

Returning to FIG. 4A, at decision block 418, a test is conducted to determine whether the snapshot request for the set of identified volumes was successful or not associated with a failure. If any volume returns a result of a failure (as described herein), the multi-volume snapshot request is considered to fail. A block 422, the distributed computing system processes the result for the failure, which can include creating additional logs or notifications. As described above, the failure of the creation of an individual snapshot can result in the failure of the multi-volume snapshot request. Alternatively, the distributed computing system may be configured with additional criteria or processing rules that allow for the exception of one or more individual snapshot failures without failing the entire multi-volume request. For example, if boot volumes are not filtered, the exceptions could allow the multi-volume request to pass if a snapshot of a boot volume fails. Although this alternative is not illustrated in FIG. 4A, in embodiments in which an exception is configured, the routine 400 can proceed to decision block 418 to determine whether any additional errors have been experienced.

Returning to decision block 418, if the generation of the snapshots for the set of identified and filtered volumes is considered successful at block 426, the distributed computing system processes the volume snapshot success result. In embodiment, a successful snapshot generation for all the identified volumes results in the return of a success for the multi-volume snapshot request. Accordingly, the user interface may be updated with the status or other notifications may be generated. At block 424, the routine 400 terminates or can be restarted.

Figure 4B:
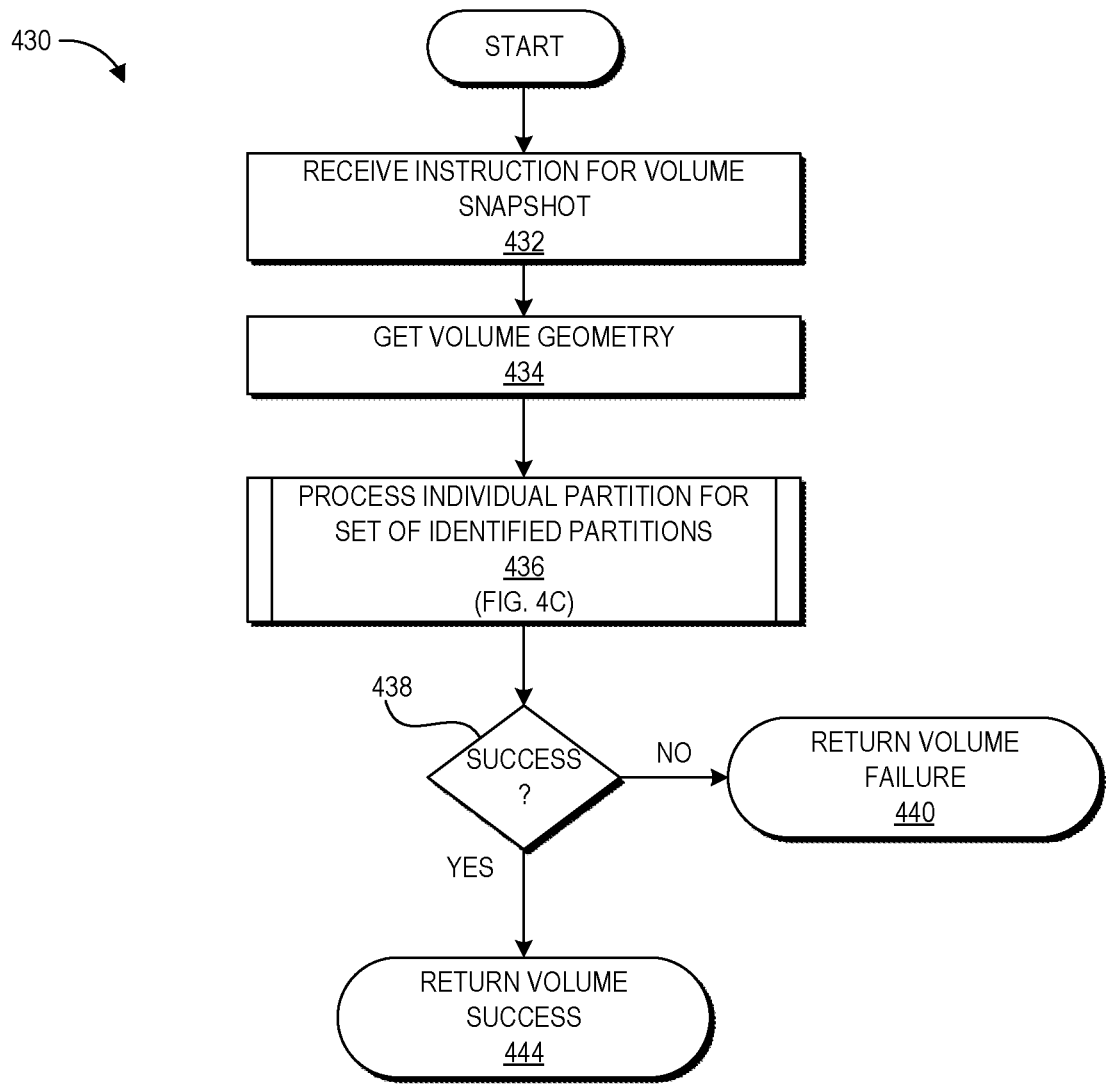
FIG. 4B is a flowchart of an example sub-process for generating individual snapshots for a volume as part of a multi-volume snapshot request.

With reference now to FIG. 4B, a sub-routine 430 for processing individual snapshots as part of the processing of a multi-volume snapshot request will be described. As described above, sub-routine 430 represents a process that can be repeated for each volume in an identified and filtered set of volumes. Multiple iterations of sub-routine 430 can implemented sequential or parallel in various embodiments. At block 432, an instruction to generate a volume snapshot for an identified volume is received or generated by the distributed computing system. At block 434, the distributed computing system obtains the volume geometry for the volume. Illustratively, the volume geometry includes an identification of the serves that host the partitions of the volume, as discussed above.

At block 436, the distributed computing system processes snapshots for individual partitions of the identified volume. An illustrative sub-routine 450 for generating snapshot information for a set of partitions for an identified volume as described for block 436 will be described with regard to FIG. 4C. With reference to FIG. 3C, the processing of snapshot information for a set of partitions can be implemented in a variety of ways. For example, the distributed computing system can sequentially process individual partitions and repeat the processing steps until all the snapshots are complete or an error is encountered at any partition. In another example, the distributed computing system can process two or more partitions in parallel or in batches. The distributed computing system can suspend processing in the event that any individual snapshot generation generates an error or indication of failure.

Returning to FIG. 4B, at decision block 438, a test is conducted to determine whether the snapshot request for the set of identified partitions was successful or not associated with a failure. If any partition returns a result of a failure (as described herein) or does not return a confirmation, the snapshot generation for the volume is considered to fail. A block 440, the sub-routine 430 returns a failure. As described above, the failure of the creation of an individual snapshot can result in the failure of the multi-volume snapshot request. Unlike routine 400, when processing individual volumes, the failure of any processing step associated with a partition will not be excepted. Alternatively, if the processing of the set of partitions is determined or characterized as successful, the sub-routine 430 returns a volume snapshot success at block 444.

Figure 4C:
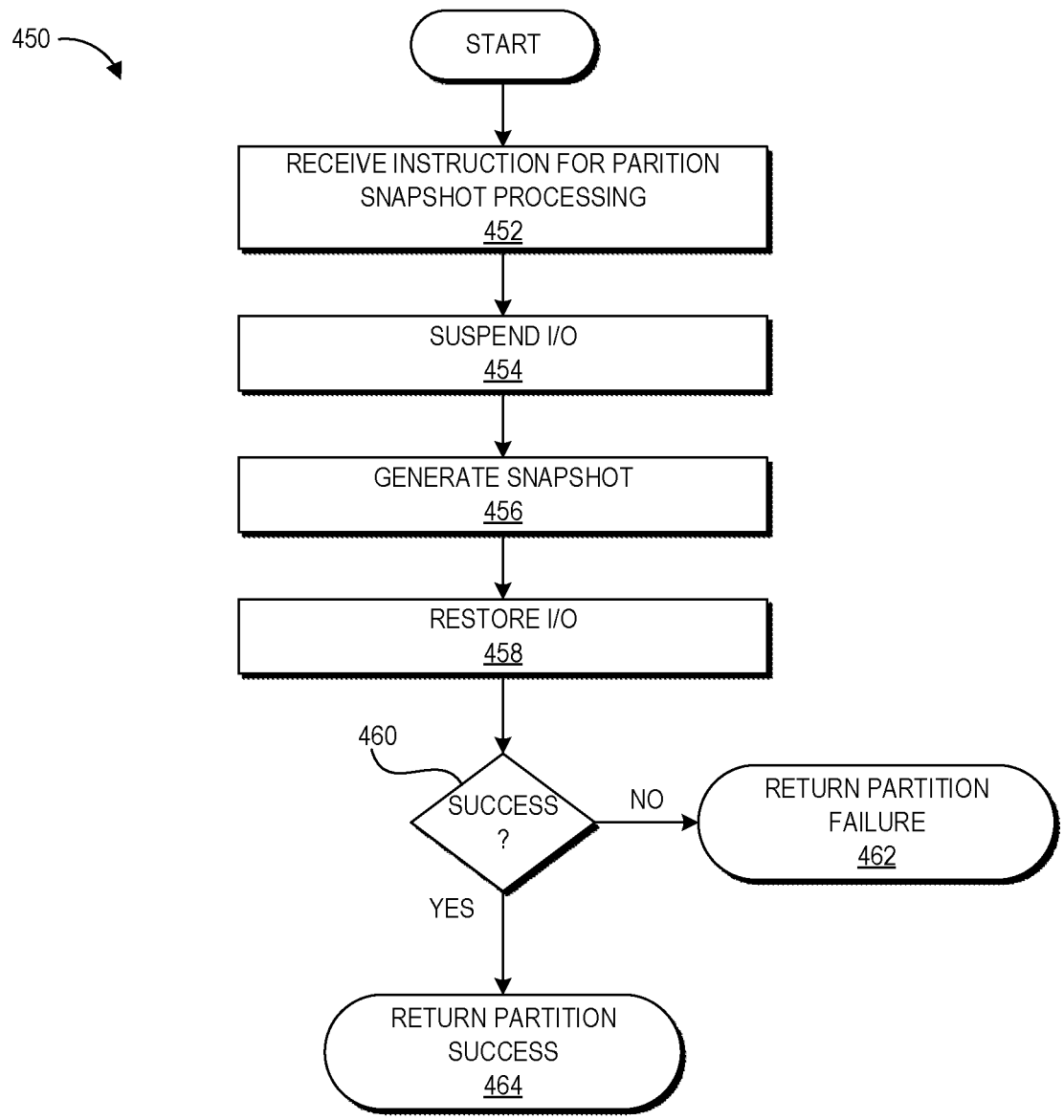
FIG. 4C is a flowchart of an example sub-process for generating individual snapshots for a set of partitions corresponding to a volume as part of a multi-volume snapshot request.

With reference now to FIG. 4C, a sub-routine 450 for processing individual partitions of an identified volume as part of the processing of a multi-volume snapshot request will be described. As described above, sub-routine 450 represents a process that can be repeated for each partition in an identified and filtered set of volumes. Multiple iterations of sub-routine 450 can implemented sequential or parallel in various embodiments. At block 452, an instruction to generate processing a snapshot for an identified partition. At block 454, the distributed computing system transmits a request to an identified server hosting the partition to suspend input/outputs. The request to suspend input/outputs can include necessary security identifiers or timing information. Illustratively, the distributed computing system can continue to receive data for the volumes and cache the data until input/outputs are restored. The receiving servers (directly or indirectly) can return a confirmation that inputs/outputs have been suspended.

At block 456, the distributed computing system generates a command for the generation of snapshot information from the specific partition. One skilled in the relevant art will appreciate that the snapshots can be generated from the collection of data from the individual partitions. At block 458, the distributed computing system transmits a request to an identified server hosting the partition to restart input/outputs. The request to suspend input/outputs can include necessary security identifiers or timing information. The receiving servers (directly or indirectly) return a confirmation that inputs/outputs have been restarted. The distributed computing system can then begin writing any cached data.

Figure 5:
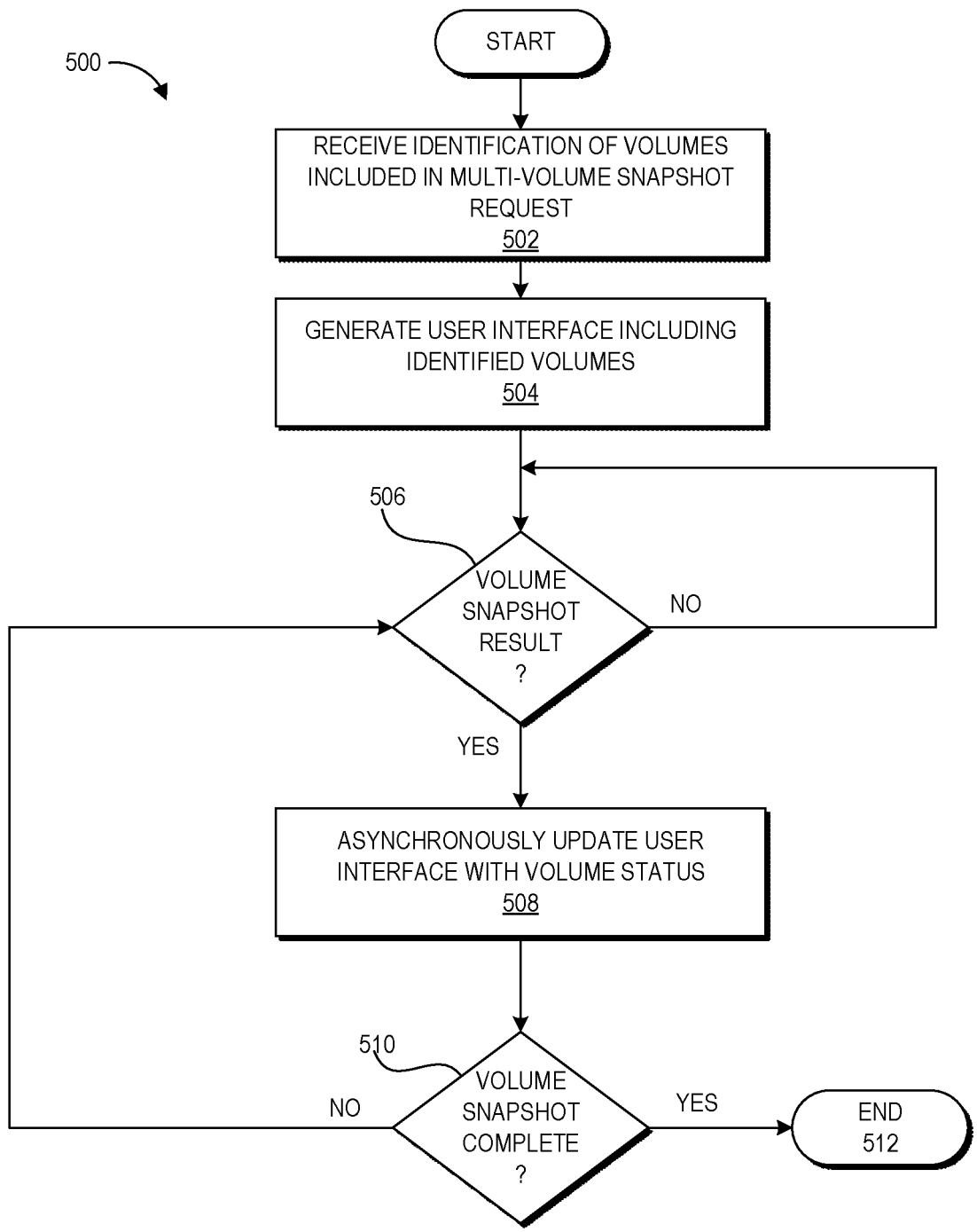
FIG. 5 is a flowchart of an example process for generating and updating user interface data as part of a multi-volume snapshot request.

At decision block 460, a test is conducted to determine whether the snapshot processing request for the individual was successful or not associated with a failure. If portion of the processing of the sub-routine 450 is not completed or successful (e.g., a failure to suspend I/O or the failure to generate the snapshot information for the partition), the snapshot generation for the partition is considered to fail. A block 440, the sub-routine 462 returns a failure. As described above, the failure of the processing of any individual partition creates a failure for the creation of an individual snapshot for the volume. In turn, the failure of a volume snapshot generation can result in the failure of the multi-volume snapshot request. Unlike routine 400, when processing individual volumes, the failure of any processing step associated with a partition will not be excepted. Alternatively, if the processing of the individual partition is determined or characterized as successful, the sub-routine 450 returns a volume snapshot success at block 464. distributed computing system Turning now to FIG. 5, a routine 500 for generating and update status information for the processing of a multi-volume snapshot request will be described. The user interface may illustratively correspond to any variety of visual, graphical or textual displays that provides information to a user via some output device. At block 502, the distributed computing system receives an identification of the identified and filtered set of volumes that are included in the multi-volume snapshot request (as identified in routine 400). At block 504, the distributed computing system generates a user interface that identifies all the volumes from the processed list of volumes. The user interface is illustratively configured to provide an identification to a user of the volumes to be encompassed in the snapshot request. Additionally, as described herein, the user interface is updated asynchronously with the status of the individual snapshot request so that a failure in any snapshot request can be identified to the user. The user interface may be generated in accordance with an established service provided by the distributed network and can also include indications as to the results of the multi-volume snapshot request.

At decision block 506, a test is conducted to determine whether a multi-volume snapshot request has been received. An illustrative routine 430 for processing individual volume snapshots was previously described with regard to FIG. 4B. If no processing results have been received, the routine 500 continues to wait for processing results. Alternatively, once a processing result is received, at block 508, the distributed computing system asynchronously updates the status of the individual snapshot generation. In this regard, the status of success or failure is asynchronously updated to the user interface. This provides the user an indication of the overall status of the multi-volume snapshot request and provides the user an indication of a possible source of a snapshot failure.

At decision block 510, a test is conducted to determine whether additional volume snapshot processing results are due or the processing is complete. Illustratively, the processing of the multi-volume request is complete once all the processing results have been received/generated or in the event of a failure of any volume snapshot requests that causes the multi-volume request to fail, as previously described. If the processing is not complete, the routine 500 returns to decision block 506 to wait for additional processing results. Alternatively, once the processing is complete, routine 500 terminates at block 512.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes 400 and 450 may begin in response to an event, such as on a predetermined or dynamically determined schedule, on demand when initiated by a user or system administer, or in response to some other event. When the process 400, 430, 450 or 500 is initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, the process 400, 430, 450 or 500 or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A computing system comprising:
   one or more control plane components of a network-accessible service implemented at a provider network; and
   a set of servers in data communication with the one or more control plane components, the set of servers having collectively stored thereon identification information representing that a plurality of volumes are attached to an identified instance;
   wherein the one or more control plane components are configured to at least:
   obtain a multi-volume snapshot request to generate a set of crash-consistent snapshots corresponding to the identified instance, wherein each snapshot in the set of snapshots represents data of a different one of the plurality of volumes at a same point in time;
   based at least in part on the identification information, identify the plurality of volumes attached to the identified instance;
   generate a user interface configured to provide a status of a snapshot generation for the plurality of volumes; and
   for an individual volume of the plurality of volumes:
   obtain volume geometry information identifying locations of a set of partitions of the individual volume, the set of partitions hosted on one or more servers of the set of servers;
   cause generation of a snapshot of a first partition in the set of partitions at the same point in time;

in response to determining that generation of a snapshot of a second partition in the set of partitions has failed, suspend the snapshot generation for the plurality of volumes and automatically delete any already generated snapshot data including at least the snapshot of the first partition; and update the user interface to provide the status of the snapshot generation for the plurality of volumes based at least in part on the determination that the generation of the snapshot of the second partition has failed.

2. The computing system of claim 1, wherein the one or more control plane components are further configured to at least, for the individual volume of the plurality of volumes, suspend input/output (I/O) for the set of partitions of the individual volume for a duration of creating the set of crash-consistent snapshots.

3. The computing system of claim 1, wherein in response to determining that generation of a snapshot of a second partition in the set of partitions has failed, the one or more control plane components are further configured to at least fail the multi-volume snapshot request and update the user interface to indicate failure of the multi-volume snapshot request.

4. A computer-implemented method comprising:
obtaining a multi-volume snapshot request to generate a set of consistent snapshots of a plurality of volumes attached to a computing instance, wherein the multi-volume snapshot request identifies the computing instance, and wherein each snapshot represents a different one of the plurality of volumes at a same point in time;
identifying the plurality of volume as being attached to the computing instance;
for an individual volume of the plurality of volumes:
obtaining information identifying a set of partitions collectively storing data associated with the individual volume, the set of partitions hosted by a set of servers in a distributed computing environment;
suspending input and output (I/O) to the set of partitions starting at the same point in time and continuing for a duration of creating an object for storing data from the set of partitions;
initiating a snapshot generation of a first partition in the set of partitions;
in response to determining that generation of a snapshot for a second partition in the set of partitions has failed, suspend snapshot generation of the set of snapshots including at least the snapshot generation of the first partition; and
causing output of an indication that the multi-volume snapshot request failed, based at least in part on the determination that generation of a snapshot for a second partition in the set of partitions has failed.

5. The computer-implemented method of claim 4,
identifying a boot volume attached to the computing instance; and
excluding the boot volume from the set of volumes of which the set of consistent snapshots is taken.

6. The computer-implemented method of claim 4, wherein the multi-volume snapshot request includes obtaining a specification of one or more volumes to exclude from the multi-volume snapshot request, the computer-implemented method further comprising generating the set of consistent snapshots to represent a subset of the plurality of volumes that excludes the one or more volumes.

7. The computer-implemented method of claim 4, further comprising:
determining that at least one volume of the plurality of volumes is of a designated type; and
excluding the at least one volume from the multi-volume snapshot request.

8. The computer-implemented method of claim 4, wherein obtaining the multi-volume snapshot request includes obtaining one or more tags to be included in the set of consistent snapshots.

9. The computer-implemented of claim 6, further comprising, for an individual volume of the plurality of volumes:
after creation of the object, enabling I/O for the set of partitions; and
copying the data from the set of partitions to the object.

10. The computer-implemented of claim 4, further comprising:
generating a user interface configured to provide a status of snapshot generation for individual volumes of the plurality of volumes; and
updating the user interface based at least in part on a result of generating a snapshot of an individual volume of the plurality of volumes.

11. The computer-implemented of claim 4, further comprising generating individual snapshots in the set of consistent snapshots in parallel.

12. The computer-implemented of claim 11, further comprising,
in response to determining that generation of a snapshot for a second partition in the set of partitions has failed automatically deleting any snapshot data already created for the set of consistent snapshots, including at least the snapshot of the first partition.

13. A non-transitory computer-readable medium storing instructions that, when executed by a computing system, cause the computing system to perform operations comprising:
obtaining a multi-volume snapshot request a set of snapshots corresponding to a set of volumes attached to a computing instance, wherein the set of snapshots includes at least a first snapshot of a first volume in the set of volumes and a second snapshot of a second volume in the set of volumes, wherein the first and second snapshots represent a particular point in time;
identifying the set of volumes as being attached to the computing instance;
initiating a first attempt to generate the first snapshot from a first identified set of partitions associated with the first volume at least partly by suspending input and output (I/O) to the first identified set of partitions of the first volume at the particular point in time;
initiating a second attempt to generate the second snapshot from a second identified set of partitions associated with the second volume at least partly by suspending I/O to the second identified set of partitions of the second volume at the particular in time; and
in response to determining that generation of the second snapshot from at least one partition in the second identified set of partitions has failed, suspend snapshot generation for the set of volumes including at least the first attempt to generate the first snapshot.

14. The non-transitory computer-readable medium of claim 13, further comprising identifying a boot volume in the set of volumes.

15. The non-transitory computer-readable medium of claim 14, the operations for further comprising filtering the boot volume such that the set of snapshots does not include a snapshot of the boot volume.

16. The non-transitory computer-readable medium of claim 13, the operations further comprising:
   creating at least a portion of the first snapshot;
   determining failure of the multi-volume snapshot request based at least in part on determining that generation of the second snapshot from at least one partition in the second identified set of partitions has failed; and
   automatically deleting the at least a portion of the first snapshot in response to determining the failure.

17. The non-transitory computer-readable medium of claim 13, the operations further comprising:
   generating an object for storing the first snapshot of the first volume based at least in part on a status of blocks of the first volume at the particular point in time;
   identifying at least a subset of the blocks of the first volume to copy to the first snapshot based at least in part on the status of the blocks; and
   copying data from the subset of the blocks to the object to create the first snapshot.

18. The non-transitory computer-readable medium of claim 17, the operations further comprising resuming I/O to the first identified set of partitions after creating the object.

* * * * *